United States Patent
Haerterich et al.

(10) Patent No.: US 10,339,311 B2
(45) Date of Patent: Jul. 2, 2019

(54) ANOMALOUS COMMIT DETECTION

(71) Applicant: SAP SE, Walldorf (DE)

(72) Inventors: Martin Haerterich, Wiesloch (DE); Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 139 days.

(21) Appl. No.: 15/435,961

(22) Filed: Feb. 17, 2017

(65) Prior Publication Data
US 2018/0239898 A1   Aug. 23, 2018

(51) Int. Cl.
*G06F 21/56* (2013.01)
*G06F 8/71* (2018.01)
*G06F 21/57* (2013.01)

(52) U.S. Cl.
CPC .............. *G06F 21/563* (2013.01); *G06F 8/71* (2013.01); *G06F 21/562* (2013.01); *G06F 21/577* (2013.01); *G06F 2221/033* (2013.01)

(58) Field of Classification Search
CPC ........... G06F 21/56; G06F 21/562–566; G06F 21/568; G06F 21/57; G06F 21/577; G06F 2221/033
See application file for complete search history.

(56) References Cited

U.S. PATENT DOCUMENTS

| | | | | |
|---|---|---|---|---|
| 2015/0067861 A1* | 3/2015 | Foley | ............... | H04L 63/145 726/24 |
| 2015/0302198 A1* | 10/2015 | Payne | ............... | G06F 21/562 726/23 |
| 2017/0103203 A1* | 4/2017 | Sharma | ............... | G06F 21/552 |

OTHER PUBLICATIONS

"Apache Subversion: "Enterprise-class centralized version control for the masses"", [online]. Retrieved from the Internet: <URL: https://subversion.apache.org/>, (Accessed Jan. 12, 2017), 2 pgs.
(Continued)

*Primary Examiner* — Kevin Bechtel
(74) *Attorney, Agent, or Firm* — Schwegman Lundberg & Woessner, P.A.

(57) ABSTRACT

Various examples are directed to detecting anomalous modifications to a software component. For example, a computing device may receive, from a version control system, version metadata describing properties of a plurality of commits for the software component. The computing device may generate a plurality of commit clusters based, at least in part, on the properties of the plurality of commits. The computing device may determine a first anomalous commit of the plurality of commits and generate an alert message indicating a first code segment modified by the first commit.

20 Claims, 8 Drawing Sheets

(56) References Cited

OTHER PUBLICATIONS

"CVS—Open Source Version Control: CVS—Concurrent Versions System.", Copyright © 2005-2006 Derek Robert Price & Ximbiot and Copyright © 1998 Free Software Foundation, Inc., [Online]. Retrieved from the Internet: <URL: http://www.nongnu.org/cvs/>, (Jul. 21, 2015), 3 pgs.
"GIT: local-branching-on-the-cheap", [Online]. Retrieved from the Internet: <URL: https://git-scm.corn/>, (Accessed Jan. 12, 2017), 3 pgs.
Caliskan-Islam, Aylin, et al., "De-anonymizing Programmers via Code Stylometry", Usenix Security Symposium, [Online]. Retrieved from the Internet: <URL: https://www.princeton.edu/~aylinc/papers/caliskan-islam_deanonymizing.pdf>, (2015), 16 pgs.
Wysopal, Chris, et al., "Static Detection of Application Backdoors (Whitepaper).", [Online]. Retrieved from the Internet: <URL: http://www.veracode.com/sites/default/files/Resources/Whitepapers/static-detection-of-backdoors-1.0.pdf>, (2007), 7 pgs.

\* cited by examiner

ANOMALOUS COMMIT DETECTION

TECHNICAL FIELD

This document generally relates to methods and systems for use with computer networks. More particularly, this document relates to methods and systems for detecting anomalous and potentially malicious code in a software component,

BACKGROUND

Software components, such as programs, applications, libraries, etc., are vulnerable to malicious code in the form of backdoors, A backdoor is functionality that is added to a software component, often intentionally, to allow otherwise unauthorized access to a user who is aware of the backdoor. For example, some backdoors may allow the user to execute components, access data, or utilize a level of privileges that would otherwise be unauthorized. Although it may be simple for a malicious actor to add a backdoor to a software component, detecting and removing backdoors is often a manual process that can be time consuming and error-prone.

BRIEF DESCRIPTION OF DRAWINGS

The present disclosure is illustrated by way of example and not limitation in the following figures.

DETAILED DESCRIPTION

Figure 1:
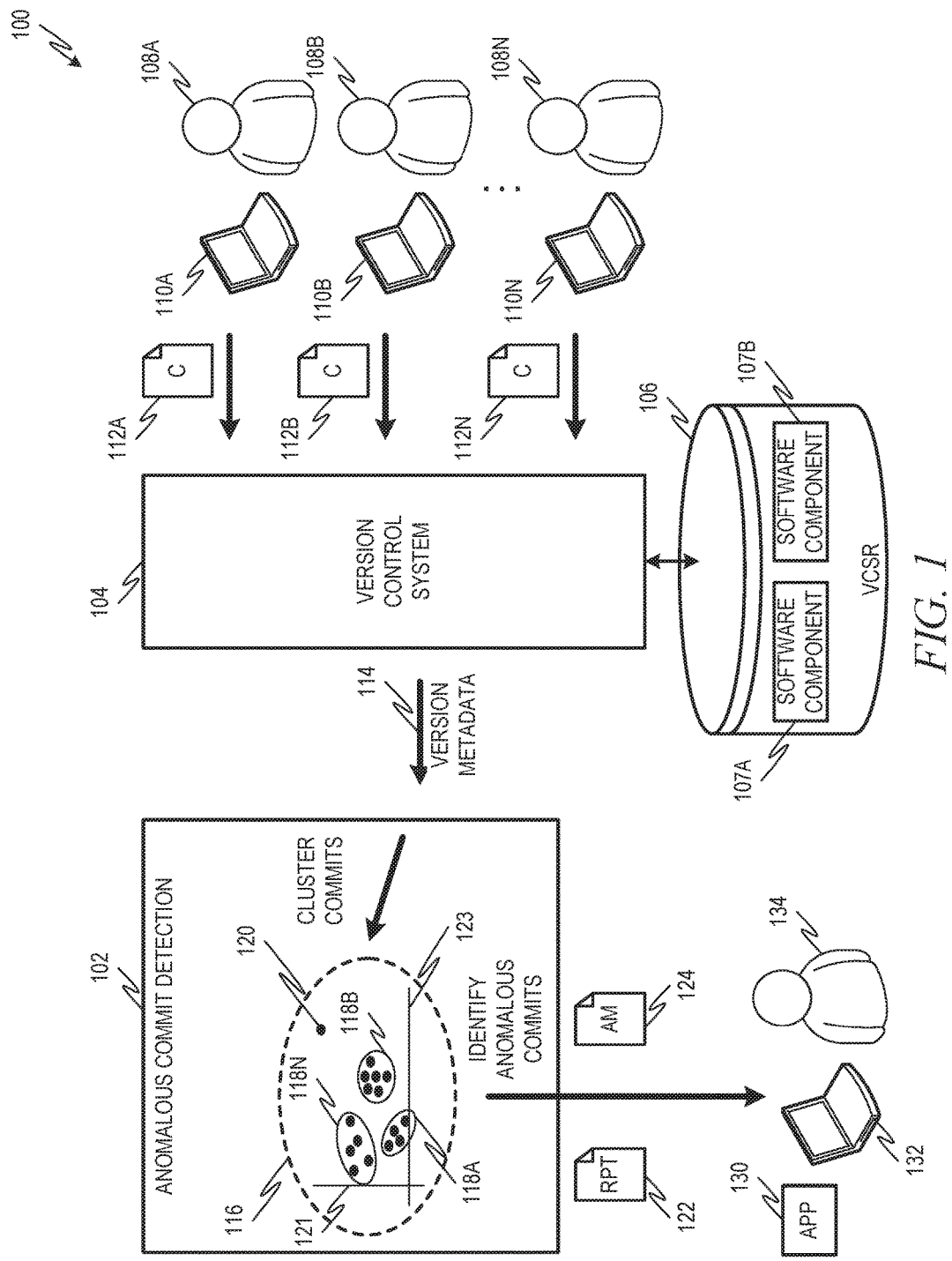
FIG. 1 is a diagram showing one example of an environment for anomalous commit detection.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods that detect anomalous commits to a software component utilizing version metadata from a version control system. A version control system may manage a version control software repository (VCSR) that maintains source code for the software component and tracks changes. For example, a developer may check out all or a portion of the software component (e.g., the source code thereof) from the version control system, When the developer has completed modifications to the checked-out portion of the software component, the developer may request that the version control system execute a commit to incorporate the changes into the software component. In response, the version control system may execute the commit, for example, by merging or branching the modifications.

The version control system maintains version metadata that describes characteristics of executed or requested commits. Version metadata for a commit may include various properties for the commit, such as a timestamp indicating when the commit was executed, the developer who requested the commit, an indication of a file or other code fragment of the software component that was modified by the commit, a size of the modification, a version control system operation associated with the commit, such as branch, merge, conflict, tag, etc.

An anomalous commit detection (ACD) system may analyze version metadata to identify anomalous commits that may introduce a backdoor or other malicious code into a software component. Anomalous commits may include commits distinguishable from other commits that occur during the ordinary course of development. One example of an anomalous commit may occur when a developer working on one part of a software component commits an isolated modification to another part of the software component. For example, modifications made in this way by a developer working outside of his or her normal responsibilities may be more likely to include malicious code. In another example, a commit may be anomalous when it is associated with a different coding style, code size, time zone, etc., compared to other commits by the same developer. This may indicate that the developer's account was been hijacked, and that the modification made by the anomalous commit may be malicious. In yet another example, a commit may be anomalous when its author is unknown or if the commit has no associated author. This may indicate that the version control system has been compromised and, again, that the modifications made by the commit may be malicious.

In various examples, the ACD system identifies anomalous commits by analyzing version metadata to generate clusters of commits having similar properties. Commits that fall within one or more clusters are likely to be part of the ordinary development process. On the other hand, commits that fall outside of the identified clusters may have anomalous characteristics that are not similar to those of other commits. When an anomalous commit is detected, data about the commit may be provided to an administrative user or other user who can inspect the modification made by the commit to determine whether a backdoor or other malicious code was added. In some examples, the ACD system generates an alert message that is provided to an ACD monitoring application executed at a computing device of the administrative user. For example, the administrative user may review the commit and subsequently allow or decline the anomalous commit. In some examples, the ACD system automatically reverses or declines to execute an anomalous commit that falls outside of a generated cluster and/or submits the anomalous commit to a review process or workflow before executing the anomalous commit.

FIG. 1 is a diagram showing one example of an environment 100 for anomalous commit detection. The environment 100 includes an ACD system 102 and a version control system 104. The version control system 104 may manage a version control software repository (VCSR) 106 that may include one or more software components 107A, 107B. Software components 107A, 107E may include any suitable code for execution at one or more computing devices. Software components 107A, 107B may include, for example, source code, object code, interpreted code, etc. Although two example software components 107A, 107B are shown at the VCSR 106, the version control system 104 may, in some examples, manage any suitable number of software components 107A, 107B including more or fewer software components 107A, 107B than are shown in FIG. 1. The version control system 104 may be or include any suitable centralized or distributed version control system such as, for example, Concurrent Versioning System (CVS), Apache Subversion (SVN), GIT, etc. The version control system 104 may be implemented on any suitable computing hardware. For example, the version control system 104 may be implemented on one or more servers or other suitable device or devices.

Developers 108A, 108B, 108N may utilize the version control system 104 to make modifications to the software components 107A, 107B. For example, developers 108A, 108B, 108N may utilize developer computing devices 110A, 110B, 110N to check-out all or a portion of the software components 107A, 107B for modification. A modification may be or include a change to existing code, a deletion of existing code, an addition of new code, etc. When a developer 108A, 1088, 108N is ready, the developer 108A, 108B, 108N and/or the developer's computing device 110A, 110B, 110N may send a commit 112A, 112B, 112N to the version control system 104. Commits, such as commits 112A, 112B, 112N, may include a modification to a code fragment of a software component 107A, 107B. In sonic examples, a commit 112A, 112B, 112N may also include an indication of a type of commit operation to be executed. For example, a modification may be merged with the software component 107A, 107B and/or branched from the software component 107A, 107B. When a commit 112A, 112B, 112N is merged with a software component 107A, 107B, the software component 107A, 107B may be replaced with an updated version of the software component 107A, 107B including the modification from the commit 112A, 112B, 112N, When a commit 112A, 112B, 112N is branched from a software component 107A, 107B, the version control system 104 may maintain parallel versions of the software component 107A, 107B including one that includes the modification indicated by the commit 112A, 112B, 112N and one that does not. Although three developers 108A, 108B, 108N, three developer computing devices 110A, 110B, 110N, and three commits 112A, 112B, 112N are show in in FIG. 1, any suitable number of developers 108A, 108B, 108N may utilize the version control system 104 to make modifications to software components 107A, 107B.

In the example of FIG. 1, the VCSR 106 includes two software components 107A, 107B, although in various examples, a version control system 104 and VCSR 106 may manage a single software component 107A, 107B or additional software components 107A, 107B (e.g., more than two). The software components 107A, 107B may be or include any suitable type of software such as, for example, an application, a program, a library, etc. Software components 107A, 107B may include various constituent pieces. For example, software components 107A, 107B may include various code fragments. A code fragment may be a unit of code in a software component 107A, 107B for which the version control system 104 maintains version metadata. For example, a code fragment may be a unit of data for which the version control system 104 accepts and/or executes commits 112A, 112B, 112N. In some examples, a code fragment is the smallest unit of data for which the version control system 104 maintains metadata and/or accepts commits 112A, 112B, 112N. In some examples, code fragments may be or correspond to logical units of data such as, for example, files, transport objects, etc. In some examples, some code fragments may include less than all of a file or transport object, and/or may be tracked across different files or transport objects. For example, during the development of a software component 107A, 107B, a particular code fragment may be included in different files, transport objects, or other logical data units.

In some examples, a software component 107A, 107B may also be described by constituent functional unit. A functional unit may be a portion of a software component 107A, 107B that performs the same function. A functional unit may include a single code fragment, multiple code fragments, less than all of a code fragment, etc. In some examples, the ACD system 102, version control system 104 or other suitable system may identify function units, for example, by considering a file system hierarchy of a software component 107A, 107B and/or by considering code dependencies between code fragments in the software component 107A, 107B.

The version control system 104 may collect and/or store version metadata 114 describing various commits 112A, 112B, 112N that are executed and/or requested by developers 108A, 108B, 108N and/or developer computing devices 110A, 110B, 110N. Version metadata 114 for a commit 112A, 112B, 112N may include properties of a commit 112A, 1123, 112N and/or other data describing the commit 112A, 112B, 112N such as, for example, data describing a time and/or date of the commit 112A, 112B, 112N, an author of the commit 112A, 112B, 112N, a code fragment or functional unit modified or to be modified by the commit 112A, 112B, 112N, a commit message associated with the commit 112A, 112B, 112N, a type of version control operation associated with the commit 112A, 112B, 112N (such as branch/merge/conflict/tag), etc.

The ACD system 102 may detect anomalous (and potentially malicious) commits 112A, 112B, 112N by analyzing and/or monitoring version metadata 114 generated by the version control system 104. The ACD system 102 may include and/or be executed at any suitable computing hardware such as, for example, a server. In some examples, the ACD system 102 is a software component executed at the same computing device as the version control system 104 and/or or as a component of the version control system 104.

The ACD system 102 may receive version metadata 114 describing requested and/or executed commits 112A, 112B, 112N including properties of the commits 112A, 112B, 112N. The ACD system 102 may generate clusters of commits 112A, 112B, 112N. A cluster of commits 112A, 112B, 112N may be a subset of the commits 112A, 112B, 112N having similar properties. Clusters may be generated, for example, by determining a distance between commits 112A, 112B, 112N in a multidimensional space. FIG. 1 shows an example multidimensional space 116 that may be used by the ACD system 102 to characterize commits. The multidimensional space 116 includes a vertical axis 121 and a horizontal axis 123. In the example multidimensional space 116, several example commits 112A, 112B, 112N are plotted, indicated by black dots. The position of the commits 112A, 112B, 112N (e.g., black dots) in the multidimensional space 116 and/or the distance between commits 112A, 112B, 112N in the multidimensional space 116 may be based on the properties of the commits 112A, 112B, 112N. Different dimensions of the multidimensional space 116, for example, may correspond to values for different commit properties or combinations of commit properties. Although two dimensions are shown, any suitable number of dimensions may be used.

In the example multidimensional space 116 of FIG. 1, three example clusters 118A, 118B, 118N are shown. Clusters 118A, 118B, 118N may be generated according to any suitable clustering technique such as, for example, density-based spatial clustering of applications with noise (DB-SCAN), k-means clustering, or any other suitable clustering algorithm or technique. Although three clusters 118A, 118B, 118N are shown in FIG. 1, various examples may find more or fewer clusters 118A, 118B, 118N. For example, the number of clusters 118A, 118B, 118N found for commits 112A, 112B, 112N directed to any particular software component 107A, 107B may depend on the software component 107A, 107B and the way that the developers 108A, 108B, 108N make modifications to the software component 107A, 107B.

A cluster 118A, 118B, 118N may be described by a cluster definition. A cluster definition may describe commit properties for commits 112A, 112B, 112N that fall within the cluster 118A, 118B, 118N. A cluster definition may take any suitable form. In some examples, (e.g., examples utilizing a DBSCAN clustering technique), a cluster definition may describe core points, a threshold distance, and a minimum number. For example, a core point may be a commit 112A, 112B, 112N that is within the threshold distance of the minimum number of other commits 112A, 112B, 112N. (E.g., the distance between two commits 112A, 112B, 112N in the multidimensional space 116 may be determined as described herein, for example, with respect to FIG. 4) A commit 112A, 112B, 112N may be considered to be in a cluster 118A, 118B, 118N if a distance between the commit 112A, 112B, 112N at least one core point commit is less than the threshold distance. In other examples, a cluster definition may be described by a threshold distance in the multidimensional space 116 from a centroid commit. A commit 112A, 112B, 112N may be considered part of a cluster 118A, 118B, 118N if the distance between the commit 112A, 112B, 112N and the centroid commit for the cluster 118A, 118B, 118N is less than a threshold distance. In yet another example, a cluster definition may be described by a distance in the multidimensional space 116 from a barycenter or center of mass of commit characteristic positions in the multidimensional space 116. A commit 112A, 112B, 112N may be considered pail of a cluster 118A, 118B, 118N if a distance between the commit 112A, 112B, 112N and the barycenter is less than the threshold distance.

Commits 112A, 112B, 112N having commit characteristics that do not fall within a cluster 118A, 118B, 118N may be considered anomalous. Anomalous commits 112A, 112B, 112N may include commits 112A, 112B, 112N that are part of the version metadata 114 used to identify the clusters 118A, 118B, 118N. In some examples, anomalous commits 112A, 112B, 112N may include commits 112A, 112B, 112N received as version metadata 114 by the ACD system 102 after the clusters 118A, 118B, 118N are generated. For example, the commits 112A, 112B, 112N indicated by the dots within the cluster 118A are in the cluster 118A. Similarly, the commits 112A, 112B, 112N indicated by the dots within the cluster 118B are in the cluster 118B; and the commits 112A, 112B, 112N indicated by the dots within the cluster 118N are in the cluster 118N. The multi-dimensional space 116 also shows an example anomalous commit 120 with parameters outside of the definitions of any of the clusters 118A, 118B, 118N.

When an anomalous commit, such as the anomalous commit 120, is detected, the ACD system 102 may take any remedial action. In some examples, the ACD system 102 may receive indications of requested commits 112A, 112B, 112N from the version control system 104 and determine whether the requested commits 112A, 112B, 112N are within the definition of a cluster 118A, 118B, 118N or, like the example anomalous commit 120, are outside of previously-defined clusters 118A, 118B, 118N (e.g., anomalous). If a commit 112A, 112B, 112N is anomalous, in some examples, the ACD system 102 may instruct the version control system 104 to reverse and/or refuse the commit 112A, 112B, 112N.

In addition to or instead of reversing or refusing an anomalous commit 120, in some examples, the ACD system 102 may send a report 122 and/or alert message 124 to an administrative user or administrator 134. The administrator 134 may utilize an administrator computing device 132 to interact with the ACD system 102. In some examples, the administrator computing device 132 may execute an ACD application 130. The ACD application 130 may be configured to communicate with the ACD system 102 to receive anomalous commit reports 122 and/or alert messages 124.

In some examples, the ACD system 102 may generate an anomalous commit report 122 periodically (e.g., daily, weekly, quarterly, etc. In some examples, in addition to or instead of generating periodic anomalous commit reports, the ACD system 102 may generate an anomalous commit report 122 upon request by the administrator 134. For example, the administrator 134 may request an anomalous commit report before a version of the software component 107A, 107B is set for release. Upon receiving the anomalous commit report 122, the administrator 134 may review the relevant software component 107A, 107B at the code fragments modified by the anomalous commit 120 or commits indicated by the anomalous commit report 122. For example, the administrator 134 may determine if an anomalous commit 120 introduced a backdoor or other malicious code and, if so, remove it from the software component 107A, 107B.

In some examples, the ACD system 102 may generate an alert message 124 upon the detection of an anomalous commit 120. The alert message 124 may be provided to the administrator computing device 132, for example, as an e-mail, text message, Java Message Service (JMS) message, or other suitable message. In sonic examples, the alert message 124 may prompt the administrator computing device 132 to awaken the ACD application 130 to provide the alert message 124 and/or another indication of the anomalous commit to the administrator 134. This, for example, may prompt the administrator 134 to review the anomalous commit 120 and determine whether it does or did introduce a backdoor or other malicious code to a software component 107A, 107B. In some examples, the version control system 104 is programmed to block an anomalous commit 120 until it is either approved or denied by the administrator 134.

Figure 2:
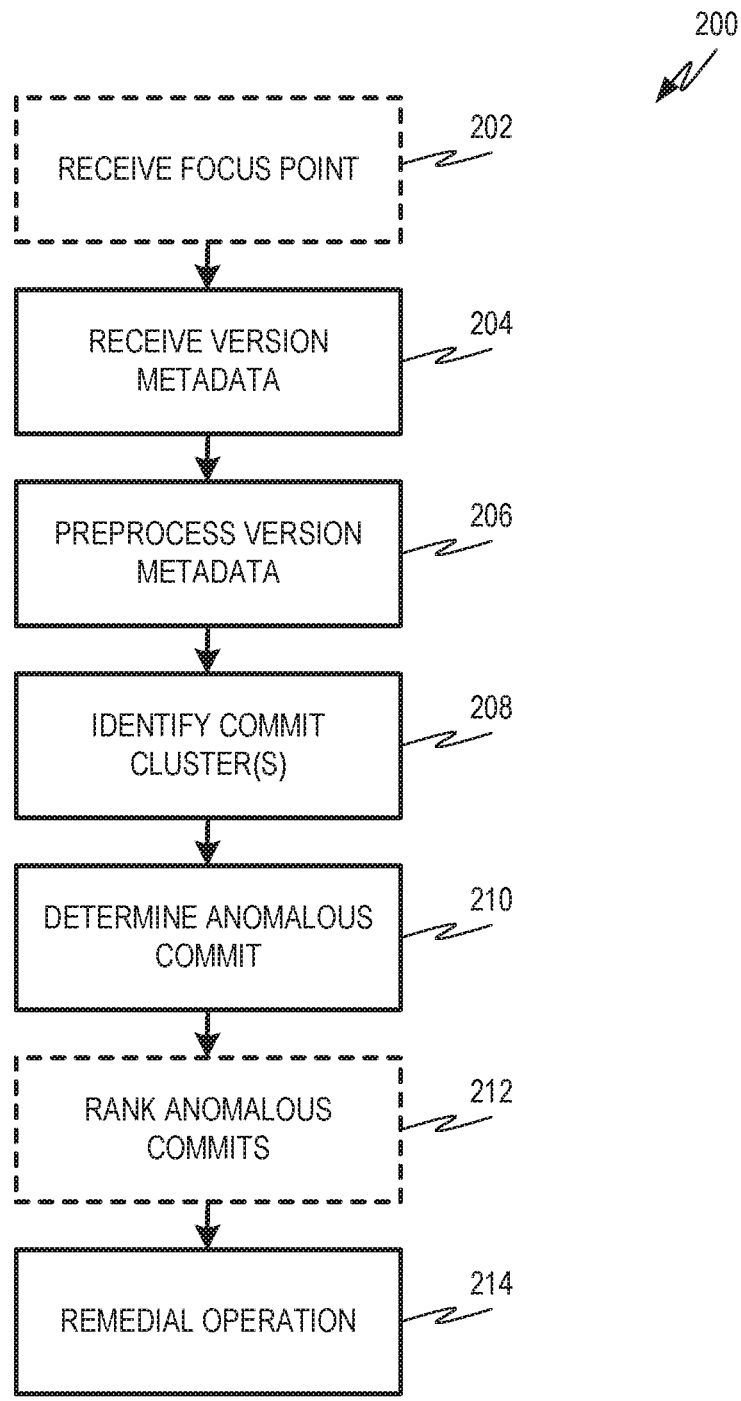
FIG. 2 is a flowchart showing one example of a process flow that may be executed by the anomalous commit detection (ACD) system of FIG. 1 to identify anomalous commits.

FIG. 2 is a flowchart showing one example of a process flow 200 that may be executed by the ACD system 102 to identify anomalous commits, such as the anomalous commit 120. At optional operation 202, the ACD system 102 may receive a focus point. The focus point may describe parameters for determining anomalous commits. For example, a focus point may describe a set of commits 112A, 112B, 112N to a software component 107A, 107B used to generate clusters 118A, 118B, 118N (e.g., all commits, commits by a particular developer or set of developers, commits modifying a particular code fragment or functional unit, etc.) In some examples, a focus point may also describe or be associated with a particular set of commit properties used for determining distances between commits (e.g., for generating clusters and determining anomalous commits 1201.

For example, when the focus point is all commits, the ACD system 102 may determine clusters considering all commits (e.g., all commits in general, all commits received for a particular software component, such as software components 107A, 107B, etc.). Distances between commits may be determined, for example, based on commit properties such as a commit timestamp, a developer or developers requesting the commit, a commit size, one or more functional units to be modified by the commit, an average criticality of the modified code, a number of developers involved in the commit, etc.

In another example where the focus point is a developer or developers, the ACD system 102 may determine cluster definitions for a set of commits requested by the developer or developers that are the focus point. Distances between commits may be determined, for example, based on commit properties such as the developers or development team that has worked on the same code fragment, the programming language used, the coding style of the modification of the commit, a functional unit modified by the commit, a weekday and/or hour of the commit (e.g., indicating the time zone from which the commit was made), etc.

In another example, where the focus point is a code fragment, the ACD system 102 may determine cluster definitions for a set of commits that request modifications to a particular code fragment or fragments. Example commit properties for determining distances between commits may include, for example, a timestamp for a commit, the developer that requested a commit, the line number or numbers of code modified by the commit, a set of code fragments committed at the same time (e.g., by the same developer), whether a commit includes broken or missing metadata, etc.

As indicated herein, receiving the focus point at operation 202 is optional. In some examples, the ACD system 102 may not utilize a focus point for determining anomalous commits and, instead, may consider any indicated pool of commits described by received version metadata according to any suitable set of commit properties.

At operation 204, the ACD system 102 may receive version metadata Version metadata may include metadata stored by the version control system 104 regarding a set of commits. For example, version metadata may describe, for various commits, a timestamp indicating when the commit was executed, the developer who requested the commit, an indication of a file or other code fragment of the software component that was modified by the commit, a size of the modification, a version control system operation associated with the commit, such as branch, merge, conflict, tag, etc. In some examples, the version metadata received at operation 204 may describe only commits corresponding to the focus point received at operation 202.

At operation 206, the ACD system 102 may preprocess the version metadata received at operation 204. Preprocessing the version metadata may include analyzing the metadata and/or commits described by the version metadata. In some examples, preprocessing may include deriving one or more commit properties, for example, properties that are not directly described by the version metadata. Additional example details for preprocessing version metadata are described herein, for example, with respect to FIG. 3.

At operation 208, the ACD system 102 may identify clusters of commits. Any suitable clustering technique or algorithm may be used including, for example, DBSCAN, k-means clustering, etc. Identifying clusters may include, for example, determining cluster definitions for the clusters, for example, as described herein. At operation 210, the ACD system 102 may determine anomalous commits. For example, anomalous commits may be commits not described by any of the cluster definitions determined at operation 208. Anomalous commits may have been described by the version metadata received at operation 204. In some examples, the ACD system 102, after having generated the clusters from the version metadata received at operation 204, may receive additional version metadata describing additional requested commits. The ACD system 102 may classify the additional commits as anomalous if they do not fit into any of the clusters.

At optional operation 212, the ACD system 102 may rank anomalous commits determined at operation 212. Anomalous commits may be ranked, for example, on their distance in the multidimensional space from a cluster. For example, where a cluster definition includes core points and a threshold distance, anomalous commits may be ranked by their distance from a core point. In another example, where a cluster definition includes a threshold distance from a barycenter or centroid, anomalous clusters may be ranked by distance from the barycenter or centroid.

At operation 214, the ACD system 102 may execute a remedial operation for the determined anomalous commits. For example, the ACD system 102 may generate a report, such as the report 122, including descriptions of anomalous commits. For example, the report may include an indication of the ranking of anomalous commits optionally determined at operation 214. Another example remedial operation may include sending an alert message, such as the alert message 124, to an administrator computing device 132 of an administrator 134.

Figure 3:
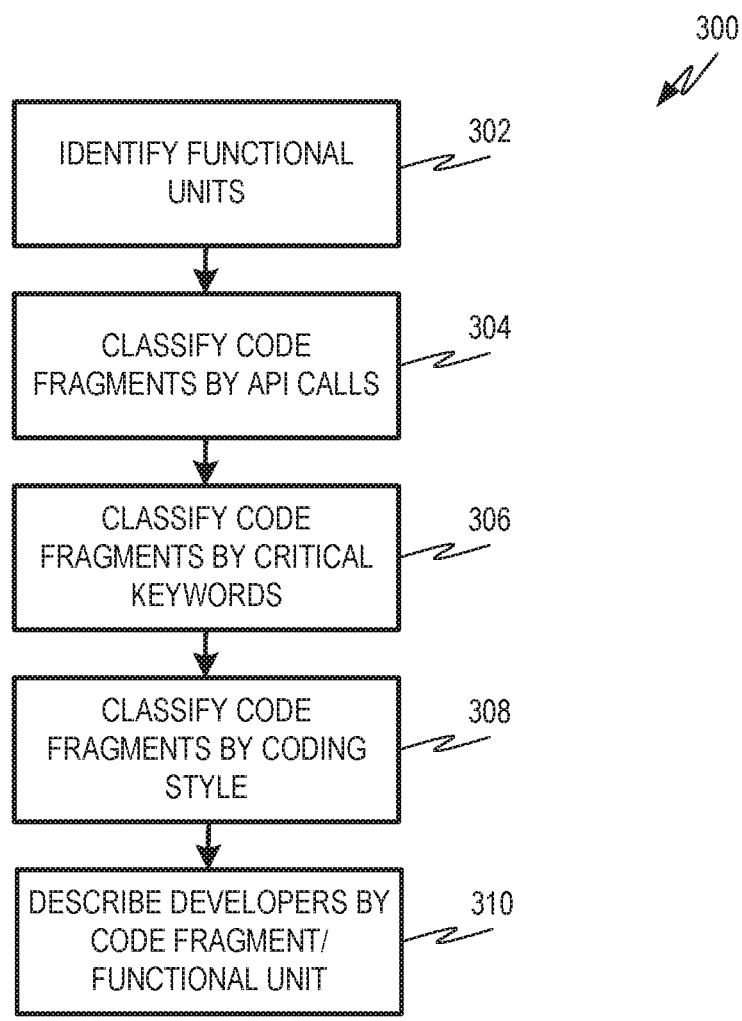
FIG. 3 is a flowchart showing one example of a process flow that may be executed by the ACD system of FIG. 1 to preprocess version metadata.

FIG. 3 is a flowchart showing one example of a process flow 300 that may be executed by the ACD system 102 to preprocess version metadata such as the version metadata 114. For example, the process flow 300 shows one example way that the ACD system 102 may execute the operation 206 of the process flow 200. For example, the ACD system 102 may preprocess the version metadata to identify commit properties that may not be directly indicated by the version metadata, but may be derivable from the version metadata.

At operation 302, the ACD system 102 may identify functional units within software component or software components described by the version metadata. For example, functional units may be identified by considering code dependencies. For example, portions of code that have similar dependencies on other portions of code may be a common functional unit. Also, portions of code that are called by many different portions of the code may similarly be considered a common functional unit. Functional units, identified at operation 302, may be utilized as a property of a commit. For example, a commit may be described by the functional unit that it is to modify, in some examples, in addition to the code fragment or code fragments that it is to modify.

At operation 304, the ACD system 102 may classify code fragments by application program interface (API) calls. An API call may be a call from a code fragment to another software component. In some examples, code fragments of different types and/or having different functions may make calls to different software components. A number and/or type of API calls made by a code fragment may be a property of commits that modify the code fragment. At operation 306, code fragments may be classified by keywords used in the code fragment. For example, keywords or classifications of keywords in a code fragment may be a property of commits that modify that code fragment.

At operation 308, the ACD system 102 may classify code fragments by coding style. For example, the ACD system 102 may identify style metrics of the code fragments. Stylistic features may describe the mechanisms and or style used by a developer or developers to achieve the function of the code fragment. Examples of style metrics include the type and amount of whitespace used in the code fragment, the form and positioning of comments in the code fragment, the length and capitalization of variable names used in the code fragment, a rate of typographical errors in the code fragment (e.g., the comments thereof, etc.) Other example style metrics of a code fragment may include the fraction of the usage of different, but functionally equivalent, types of loops or branches, a depth of syntactical nesting, etc.

At operation 310, the ACD system 102 may classify code fragments by the developers who have written (e.g., provided commits) for the code fragment. For example, code fragments may be classified by the average number of developers to commit modifications to the code fragments, the specific developers to commit modifications to the code fragments, other properties of the developers (such as time zone), etc. The classifications of code fragments performed as part of the process flow 300 may be utilized as properties of commits. For example, commit properties may include the corresponding properties of the code fragment or code fragments that are modified by the commit.

Figure 4:
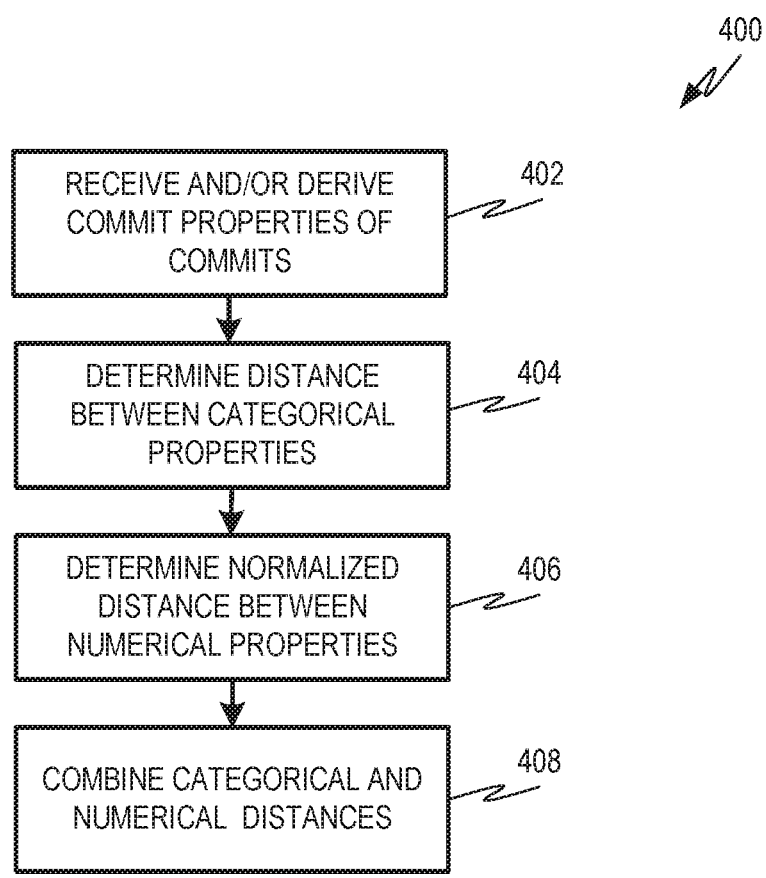
FIG. 4 is a flowchart showing one example of a process flow that may be executed by the ACD system of FIG. 1 to find a distance between commits.

FIG. 4 is a flowchart showing one example of a process flow 400 that may be executed by the ACD system 102 to find a distance between commits, such as commits 112A, 112B, 112N. At operation 402, the ACD system 102 may receive and/or derive the properties of the commits to be compared. Properties of a commit may be received, for example, as part of version metadata received from a version control system, such as the version control system 104 and/or derived. Commit properties may be any properties or other descriptors of a commit.

For example, a timestamp property may indicate a time when a commit was requested by a developer and/or executed by the version control system. A commit size may include any indication of the size of the code modified by a commit including, for example, the size of a code fragment or fragments affected by the commit, a number of code fragments affected by the commit, a number of lines of code within a code fragment that are modified, etc.

A developer property may indicate a developer or developers who requested a commit. A size property may indicate a size of a modification requested by a commit. A criticality, or average criticality, of a commit may be an indication of the way in which a modified code fragment references, or is referenced by, other portions of a software component. For example, the ACD system 102 may determine the criticality of a commit considering the API calls or other calls made by the code fragment as determined, for example, during pre-processing.

A number of developers property may describe the number of developers who requested commits to the code fragment or fragments affected by the commit. A collaborators or team property for a commit may indicate the developers who have worked on the code fragment or code fragments modified by a commit, developers who were part of the same commit request, and/or developers who were involved in commits requested at the same time as the considered commit (e.g., co-committed code fragments).

At operation 404, the ACD system 102 may determine a distance between categorical properties of the commits (e.g., a categorical distance). A categorical property may be a property that has a value selected from a set of allowable values, such as a property indicating line numbers of code affected by a commit, a developer requesting the commit, etc. The distance between categorical properties may be determined using any suitable measure of distance. In some examples, a Hamming distance may be used. A Hamming distance may be, for example, a number of changes that would need to be made to the categorical properties of one commit to make them equivalent to the categorical properties of the other commit. In some examples, the ACD system 102 may determine a single Hamming distance based on the total number of changes to transition from the set of categorical properties describing one commit to the set of categorical properties describing the second commit. For example, if one commit differs from a second commit in two out of five categorical properties, then the Hamming distance between the first commit and the second commit is two. In other examples, the ACD system 102 may determine multiple Hamming distances, with each Hamming distance indicating a number of changes between one categorical property of the one commit and an equivalent categorical property of the other commit. For example, if one commit differs from a second commit by two increments in a first categorical property and one increment in a second categorical property, the Hamming distances between the two commits may be two for the first categorical property and one for the second categorical property.

At operation 406, the ACD system 102 may determine a distance between numerical properties of the commits (e.g., a numerical distance). Numerical properties may include properties having a numerical value, Examples of numerical properties may include a commit size property, a timestamp property, etc. In some examples, numerical properties may be normalized, over a determined, interval, such as between [0,1]. Similar to operation 404, in some examples, the ACD system 102 may determine a single numerical distance or may determine separate numerical distances by commit property. At operation 408, the ACD system 102 may combine categorical and numerical distances determined at operation 408 to determine a distance between the two commits. Any suitable technique may be used to combine the categorical and numerical distances such as, for example, a sum of squares technique.

Figure 5:
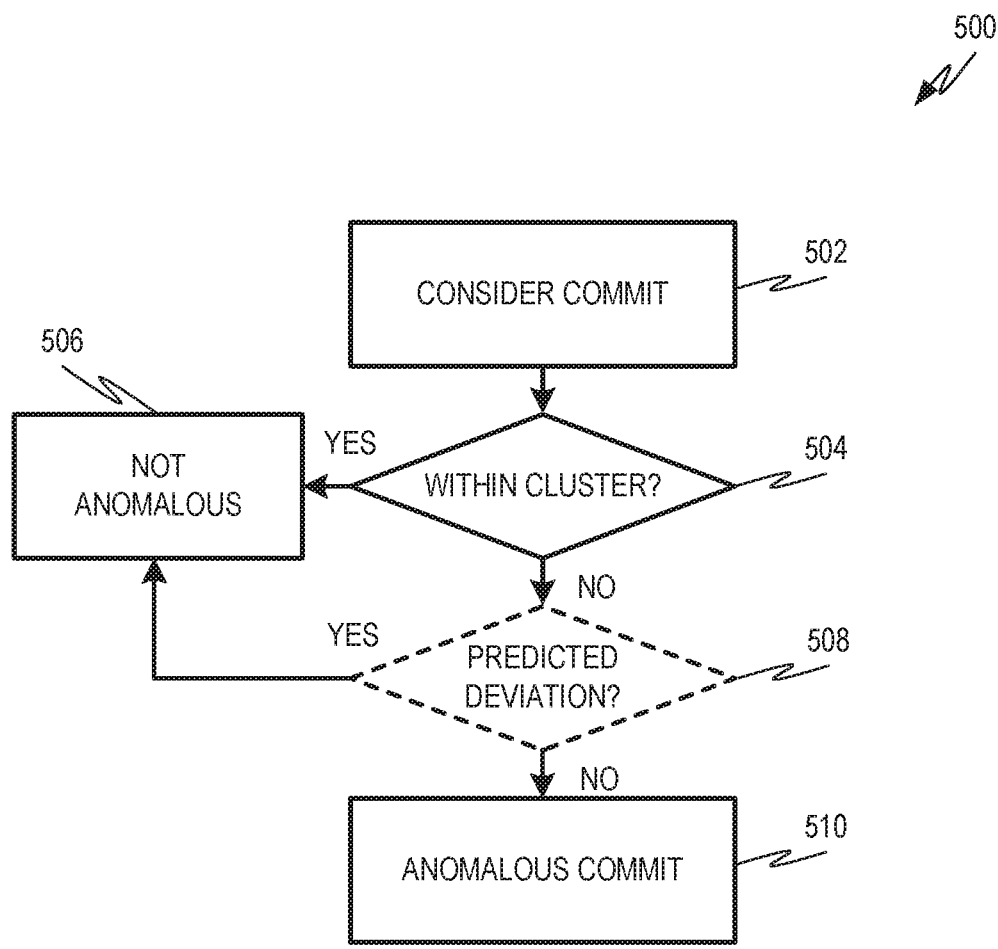
FIG. 5 is a flowchart showing one example of a process flow that may be executed by the ACD system of FIG. 1 to determine anomalous commits.

FIG. 5 is a flowchart showing one example of a process flow 500 that may be executed by the ACD system 102 to determine anomalous commits. For example, the process flow 500 may be one example way of executing operation 210 of the process flow 200 described herein. At operation 502, the ACD system 102 may consider a commit. The commit, for example, may have been described by the version metadata from which the clusters (e.g., clusters 118A, 118B, 118N) were derived. In some examples, the commit considered at operation 502 may be a newly-requested or newly-executed commit described by version metadata received after the clusters were generated.

At operation 504, the ACD system 102 may determine whether the considered commit is in any defined cluster. This may be performed, for example, by comparing the considered commit to the cluster definitions of the various clusters. Comparing the considered commit to a cluster definition may be performed in various different ways depending on the type of cluster definition. For example, for a cluster definition including a centroid commit, the ACD system 102 may determine a distance between the considered commit and the centroid commit, for example, as described with respect to FIG. 4. If the distance is less than a threshold distance, the considered commit may be a part of the cluster, For a cluster definition including a barycenter, the ACD system 102 may determine a distance between the considered commit and the barycenter. (For example, the ACD system 102 may find a set of properties and/or set of categorized and/or numerical distances for the barycenter by averaging or otherwise combining the properties of the commits making up the cluster.) Again, if the distance is less than a threshold distance, the considered commit may be a part of the cluster. For a cluster definition including core points, the ACD system 102 may determine distances between the considered commit and some or all of the core point commits of the cluster. If the distance between the considered commit and at least one (or another threshold quantity) of the core point commits is less than a threshold, then the considered commit may be a part of the cluster.

If the considered commit is within a cluster, then the ACD system 102 may determine, at operation 506, that the considered commit is not anomalous. If the considered commit is not within a cluster, then the ACD system 102 may proceed. Optionally, at operation 508, the ACD system 102 may determine if the considered commit is within a predicted deviation of a cluster. In some examples, the ACD system 102 may utilize a univariate Box-Jenkins model or other suitable model to model commit properties (e.g., numerical properties) individually, generating predicted deviations for some or all of the commit properties of the clusters. If the considered commit falls within the predicted deviations of a cluster, then the ACD system 102 may determine, at operation 506, that it is not anomalous. If the considered commit falls outside the predicted deviations of a cluster, the ACD system 102 may determine, at operation 510, that the considered commit is an anomalous commit. In examples where operation 508 is omitted, the considered commit may be determined to be anomalous at operation 510 if it is not within any clusters at operation 504.

Figure 6:
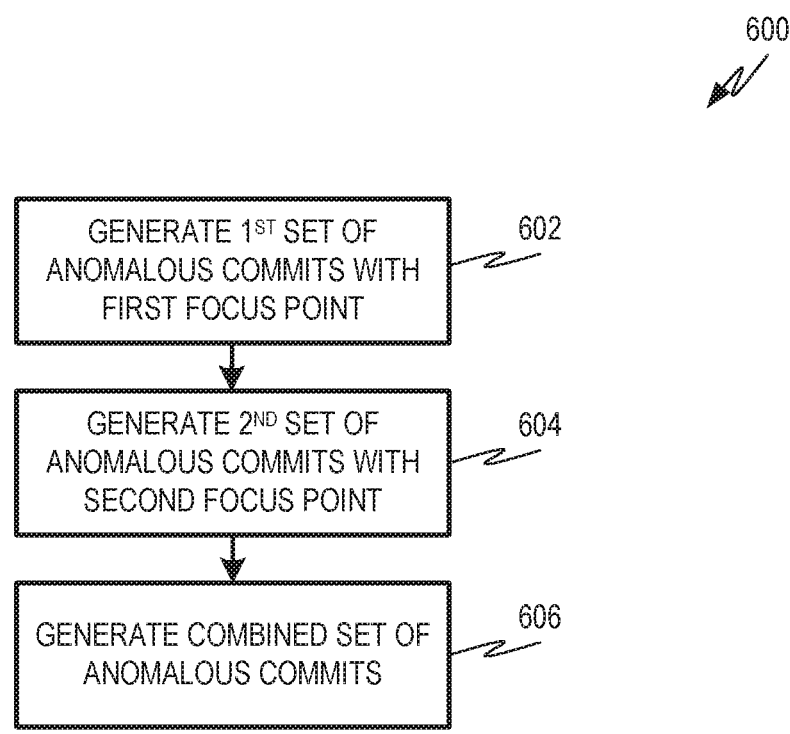
FIG. 6 is a flowchart showing one example of a process flow for determining anomalous commits utilizing multiple focus points.

FIG. 6 is a flowchart showing one example of a process flow 600 for determining anomalous commits utilizing multiple focus points. For example, as described herein, anomalous commits may be determined with respect to different focus points, such as all code fragments, by developer, by code fragment, etc. As described herein, generating anomalous commits with different focus points may involve considering different sets of initial commits and/or utilizing different commit properties to determine the distance between commits. The process flow 600 shows how the ACD system 102 may determine anomalous commits with respect to multiple focus points and cross reference the resulting anomalous commits.

At operation 602, the ACD system 102 may generate a first set of anomalous commits with respect to a first focus point, for example, as described herein with respect to FIG. 2. At operation 604, the ACD system 102 may generate a second set of anomalous commits with respect to a second focus point in a similar manner. Although the process flow 600 shows determining sets of anomalous commits with only two focus points, additional focus points may also be used.

After determining sets of commits with different focus points, the ACD system 102 may have two (or more) sets of anomalous commits. The ACD system 102 may generate a combined set of anomalous commits at operation 606 from the two or more sets of anomalous commits. Any suitable technique may be used. For example, an anomalous commit may be included in the combined set if it appears in any of the anomalous commit sets, on all of the anomalous commits, or in another suitable combination.

Figure 7:
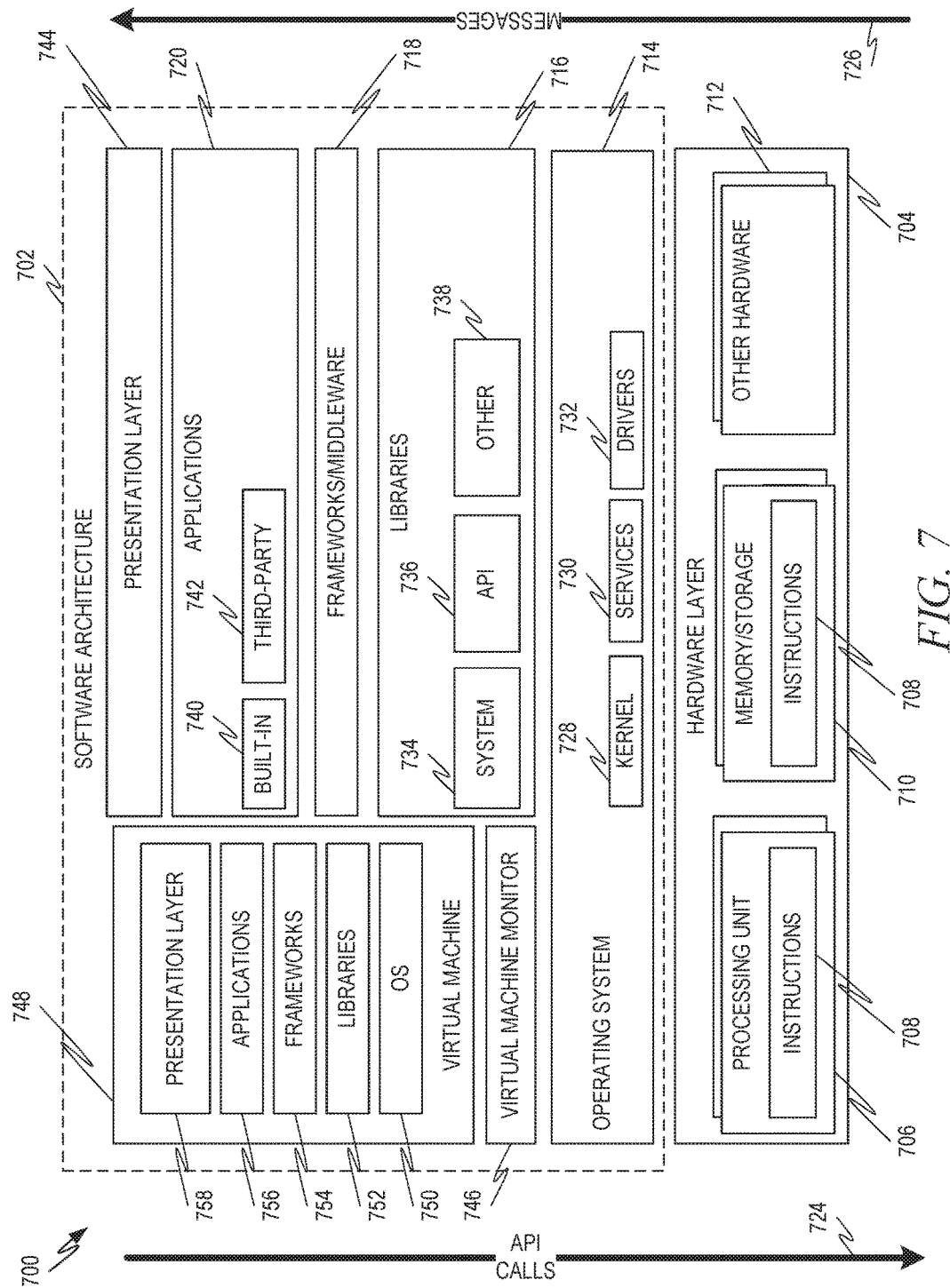
FIG. 7 is a block diagram showing one example of a software architecture for a computing device.

FIG. 7 is a block diagram 700 showing one example of a software architecture 702 for a computing device. For example, the architecture 702 may be utilized by any of the computing devices or similar components of the environment 100 described herein. The architecture 702 may be used in conjunction with various hardware architectures, for example, as described herein. FIG. 7 is merely a non-limiting example of a software architecture 702 and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system 800 of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 which represents any other hardware of the hardware layer 704, such as the other hardware illustrated as part of computer system 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720 and presentation layer 744. Operationally, the applications 720 and/or other components within the layers may invoke application programming interface (API) calls 724 through the software stack and access a response, returned values, and so forth illustrated as messages 726 in response to the API calls 724. The layers illustrated are representative in nature and not all software architectures 702 have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 9D in a graphic context on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system 714 or platform.

The applications 720 include built-in applications 740 and/or third party applications 742. Examples of representative built-in applications 740 may include, hut are not limited to, a contacts application, a browser application, a book reader application, a location application, a media application, a messaging application, and/or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a mobile operating system 714 such as iOS™, Android™, Windows® Phone, or other mobile computing device operating systems 714. In this example, the third party application 742 may invoke the API calls 724 provided by the mobile operating system such as operating system 714 to facilitate functionality described herein.

The applications 720 may utilize built in operating system functions (e.g., kernel 728, services 730 and/or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures 702 utilize virtual machines. In the example of FIG. 7, this is illustrated by virtual machine 748. A virtual machine 748 creates a software environment where applications/modules can execute as if they were executing on a hardware computing device. A virtual machine 748 is hosted by a host operating system (operating system 714) and typically, although not always, has a virtual machine monitor 746, which manages the operation of the virtual machine 748 as well as the interface with the host operating system (i.e., operating system 714). A software architecture 702 executes within the virtual machine 748 such as an operating system 750, libraries 752, frameworks/middleware 754, applications 756 and/or presentation layer 758. These layers of software architecture executing within the virtual machine 748 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of perforating certain operations and may be configured or arranged in a certain manner. In example embodiments, one or more computer systems (e.g., a standalone, client, or server computer system) or one or more processors may be configured by software (e.g., an application 720 or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least sonic of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures 702 merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures 702 that may be deployed, in various example embodiments.

Example Machine Architecture and Machine-Readable Medium

Figure 8:
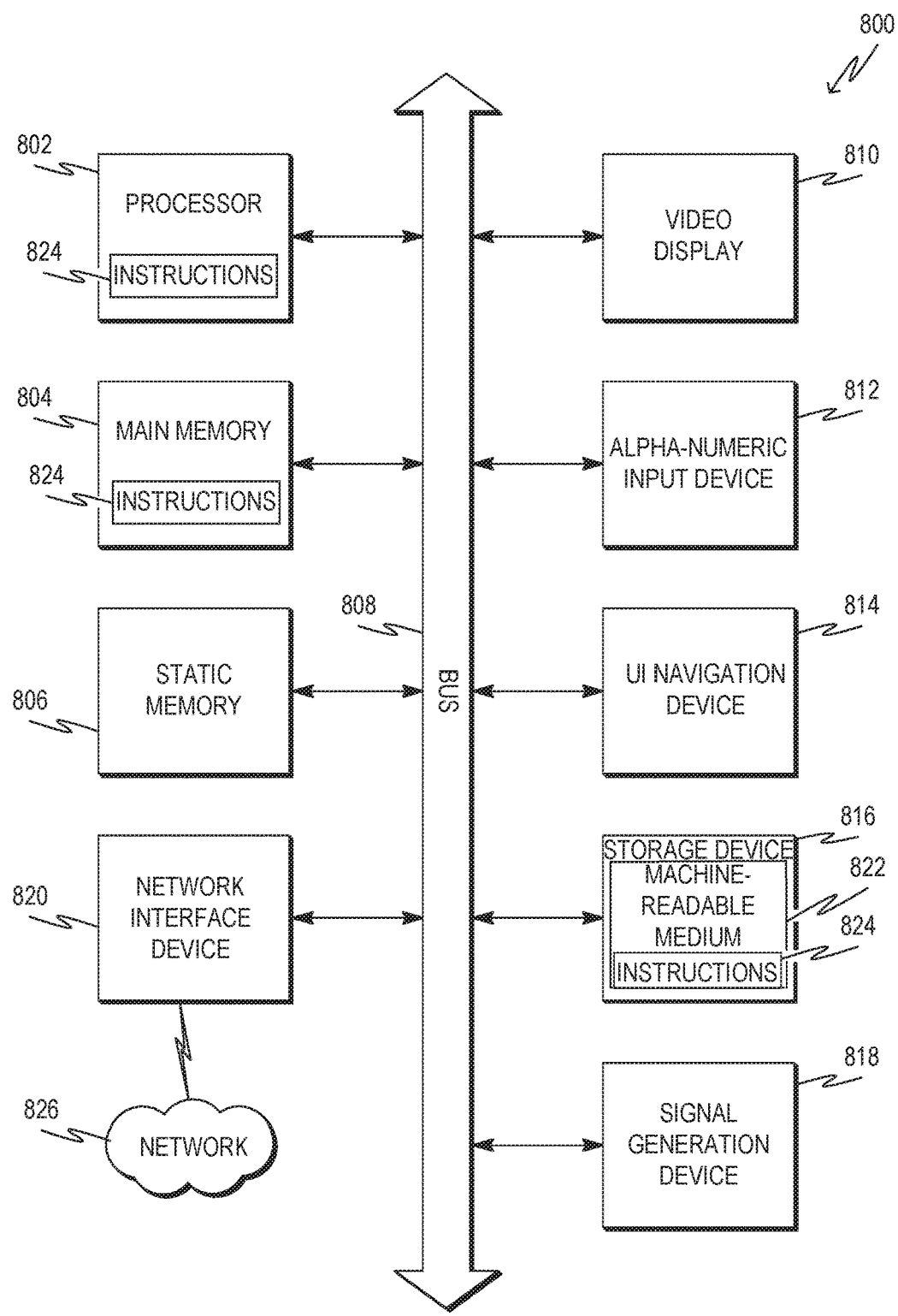
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions 824 (sequential or otherwise) that specify actions to be taken by that machine. Further, while only a single machine is illustrated, the term "machine" shall also be taken to include any collection of machines that individually or jointly execute a set (or multiple sets) of instructions 824 to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., Hypertext Transfer Protocol or HTTP). Examples of communication networks 826 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

Example 1 is a system for detecting anomalous modifications to a software component, the system comprising: a computing device comprising one or more processors and a memory in communication with the one or more processors, wherein the computing device is programmed to perform operations comprising: receiving, from a version control system, version metadata describing properties of a plurality of commits for the software component; generating a plurality of commit clusters based, at least in part, on the properties of the plurality of commits, wherein the plurality of commit clusters comprises a first commit cluster and a second commit cluster; determining a first anomalous commit of the plurality of commits, wherein determining the first anomalous commit comprises: determining that a first commit of the plurality of commits is not in the first commit cluster; and determining that the first commit is not in the second commit cluster; and generating an alert message indicating a first code segment modified by the first commit.

In Example 2, the subject matter of Example 1 optionally includes Wherein the computing device is further programmed to perform operations comprising receiving an indication of a focus point describing the plurality of commits.

In Example 3, the subject matter of Example 2 optionally includes wherein the computing device is further programmed to perform operations comprising sending a request for the version metadata to the version control system, wherein the request describes the focus point.

In Example 4, the subject matter of any one or more of Examples 2-3 optionally includes wherein the focus point comprises an indication of a developer requesting each of the plurality of commits.

In Example 5, the subject matter of any one or more of Examples 2-4 optionally includes wherein the focus point comprises an indication of a code fragment modified by each of the plurality of commits.

In Example 6, the subject matter of any one or more of Examples 1-5 optionally includes wherein the computing device is further programmed to perform operations comprising preventing the first commit from modifying the software component.

In Example 7, the subject matter of any one or more of Examples 1-6 optionally includes wherein the computing device is further programmed to perform operations comprising: receiving a portion of first code segment modified by a first commit of the plurality of commits; and determining a first style metric describing the first code segment, wherein the first style metric of the first code segment is a property of the first code segment.

In Example 8, the subject matter of any one or more of Examples 1-7 optionally includes wherein the computing device is further programmed to perform operations comprising determining a distance between the first commit and a second commit.

In Example 9, the subject matter of Example 8 optionally includes wherein the first commit is described by a first set of categorical properties and a first set of numerical properties, wherein the second commit is described by a second set of categorical properties and a second set of numerical properties, and wherein determining the distance comprises: determining a categorical distance between the first set of categorical properties and the second set of categorical properties; determining a numerical distance between the first set of numerical properties and the second set of numerical properties; and combining the categorical distance and the numerical distance to generate the distance between the first commit and the second commit.

In Example 10, the subject matter of any one or more of Examples 8-9 optionally includes wherein the second commit is in the first commit cluster, and wherein determining that the first commit is not in the first commit cluster comprises determining that the distance between the first commit and the second commit is greater than a threshold distance.

In Example 11, the subject matter of any one or more of Examples 1-10 optionally includes wherein the computing device is further programmed to perform operations comprising: determining a predicted deviation of the first commit cluster; and determining that the first commit is not with the predicted deviation of the first commit cluster.

Example 12 is a method for detecting anomalous modifications to a software component, the method comprising: receiving, by a computing device and from a version control system, version metadata describing properties of a plurality of commits for the software component; generating, by the computing device, a plurality of commit clusters based, at least in part, on the properties of the plurality of commits, wherein the plurality of commit clusters comprises a first commit cluster and a second commit cluster; determining, by the computing device, a first anomalous commit of the plurality of commits, wherein determining the first anomalous commit comprises: determining that a first commit of the plurality of commits is not in the first commit cluster; and determining that the first commit is not in the second commit cluster; and generating, by the computing device, an alert message indicating a first code segment modified by the first commit.

In Example 13, the subject matter of Example 12 optionally includes receiving an indication of a focus point describing the plurality of commits.

In Example 14, the subject matter of Example 13 optionally includes sending a request for the version meta.data to the version control system, wherein the request describes the focus point.

In Example 15, the subject matter of any one or more of Examples 13-14 optionally includes wherein the focus point comprises an indication of a developer requesting each of the plurality of commits.

In Example 16, the subject matter of any one or more of Examples 13-15 optionally includes wherein the focus point comprises an indication of a code fragment modified by each of the plurality of commits.

In Example 17, the subject matter of any one or more of Examples 12-16 optionally includes determining a distance between the first commit and a second commit.

In Example 18, the subject matter of Example 17 optionally includes wherein the first commit is described by a first set of categorical properties and a first set of numerical properties, wherein the second commit is described by a second set of categorical properties and a second set of numerical properties, and wherein determining the distance comprises: determining a categorical distance between the first set of categorical properties and the second set of categorical properties; determining a numerical distance between the first set of numerical properties and the second set of numerical properties; and combining the categorical distance and the numerical distance to generate the distance between the first commit and the second commit.

In Example 19, the subject matter of any one or more of Examples 17-18 optionally include wherein the second commit is in the first commit cluster, and wherein determining that the first commit is not in the first commit cluster comprises determining that the distance between the first commit and the second commit is greater than a threshold distance.

Example 20 is a machine-readable storage medium comprising instructions thereon that, when executed by a computing device, cause the computing device to perform operations, the machine-readable storage medium comprising: receiving, from a version control system, version metadata describing properties of a plurality of commits for a software component; generating a plurality of commit clusters based, at least in part, on the properties of the plurality of commits, wherein the plurality of commit clusters comprises a first commit cluster and a second commit cluster; determining a first anomalous commit of the plurality of commits, wherein determining the first anomalous commit comprises: determining that a first commit of the plurality of commits is not in the first commit cluster; and determining that the first commit is not in the second commit cluster; and generating an alert message indicating a first code segment modified by the first commit.

What is claimed is:

1. A system for detecting anomalous modifications to a software component, the system comprising:
 a computing device comprising one or more processors and a memory in communication with the one or more processors, wherein the computing device is programmed to perform operations comprising:
  receiving, from a version control system, version metadata describing properties of a plurality of commits for the software component;
  generating a distance in a multidimensional space between a first commit of the plurality of commits and a second commit of the plurality of commits, wherein a first dimension of the multidimensional space corresponds to at least one commit property;
  generating a plurality of commit clusters based, at least in part, on the distance, wherein the plurality of commit clusters comprises a first commit cluster and a second commit cluster;
  determining a first anomalous commit of the plurality of commits, wherein determining the first anomalous commit comprises:

determining that a first commit of the plurality of commits is not in the first commit cluster; and
determining that the first commit is not in the second commit cluster; and
generating an alert message indicating a first code segment modified by the first commit.

2. The system of claim 1, wherein the computing device is further programmed to perform operations comprising receiving an indication of a focus point describing the plurality of commits.

3. The system of claim 2, wherein the computing device is further programmed to perform operations comprising sending a request for the version metadata to the version control system, wherein the request describes the focus point.

4. The system of claim 2, wherein the focus point comprises an indication of a developer requesting each of the plurality of commits.

5. The system of claim 2, wherein the focus point comprises an indication of a code fragment modified by each of the plurality of commits.

6. The system of claim 1, wherein the computing device is further programmed to perform operations comprising preventing the first commit from modifying the software component.

7. The system of claim 1, wherein the computing device is further programmed to perform operations comprising:
receiving a portion of first code segment modified by a first commit of the plurality of commits; and
determining a first style metric describing the first code segment, wherein the first style metric of the first code segment is a property of the first code segment.

8. The system of claim 1, wherein the computing device is further programmed to perform operations comprising determining a distance between the first commit and a second commit.

9. The system of claim 8, wherein the first commit is described by a first set of categorical properties and a first set of numerical properties, wherein the second commit is described by a second set of categorical properties and a second set of numerical properties, and wherein determining the distance comprises:
determining a categorical distance between the first set of categorical properties and the second set of categorical properties;
determining a numerical distance between the first set of numerical properties and the second set of numerical properties; and
combining the categorical distance and the numerical distance to generate the distance between the first commit and the second commit.

10. The system of claim 8, wherein the second commit is in the first commit cluster, and wherein determining that the first commit is not in the first commit cluster comprises determining that the distance between the first commit and the second commit is greater than a threshold distance.

11. The system of claim 1, wherein the computing device is further programmed to perform operations comprising:
determining a predicted deviation of the first commit cluster; and
determining that the first commit is not with the predicted deviation of the first commit cluster.

12. A method for detecting anomalous modifications to a software component, the method comprising:
receiving, by a computing device and from a version control system, version metadata describing properties of a plurality of commits for the software component;
generating a distance in a multidimensional space between a first commit of the plurality of commits and a second commit of the plurality of commits, wherein a first dimension of the multidimensional space corresponds to at least one commit property;
generating, by the computing device, a plurality of commit clusters based, at least in part, on the distance, wherein the plurality of commit clusters comprises a first commit cluster and a second commit cluster;
determining, by the computing device, a first anomalous commit of the plurality of commits, wherein determining the first anomalous commit comprises:
determining that a first commit of the plurality of commits is not in the first commit cluster; and
determining that the first commit is not in the second commit cluster; and
generating, by the computing device, an alert message indicating a first code segment modified by the first commit.

13. The method of claim 12, further comprising receiving an indication of a focus point describing the plurality of commits.

14. The method of claim 13, further comprising sending a request for the version metadata to the version control system, wherein the request describes the focus point.

15. The method of claim 13, wherein the focus point comprises an indication of a developer requesting each of the plurality of commits.

16. The method of claim 13, wherein the focus point comprises an indication of a code fragment modified by each of the plurality of commits.

17. The method of claim 12, further comprising determining a distance between the first commit and a second commit.

18. The method of claim 17, wherein the first commit is described by a first set of categorical properties and a first set of numerical properties, wherein the second commit is described by a second set of categorical properties and a second set of numerical properties, and wherein determining the distance comprises:
determining a categorical distance between the first set of categorical properties and the second set of categorical properties;
determining a numerical distance between the first set of numerical properties and the second set of numerical properties; and
combining the categorical distance and the numerical distance to generate the distance between the first commit and the second commit.

19. The method of claim 17, wherein the second commit is in the first commit cluster, and wherein determining that the first commit is not in the first commit cluster comprises determining that the distance between the first commit and the second commit is greater than a threshold distance.

20. A non-transitory machine-readable storage medium comprising instructions thereon that, when executed by a computing device, cause the computing device to perform operations comprising:
receiving, from a version control system, version metadata describing properties of a plurality of commits for a software component;
generating a distance in a multidimensional space between a first commit of the plurality of commits and a second commit of the plurality of commits, wherein a first dimension of the multidimensional space corresponds to at least one commit property;

generating a plurality of commit clusters based, at least in part, on the distance, wherein the plurality of commit clusters comprises a first commit cluster and a second commit cluster;
determining a first anomalous commit of the plurality of commits, wherein determining the first anomalous commit comprises:
 determining that a first commit of the plurality of commits is not in the first commit cluster; and
 determining that the first commit is not in the second commit cluster; and
generating an alert message indicating a first code segment modified by the first commit.

* * * * *